(12) United States Patent
Mathur

(10) Patent No.: US 11,269,741 B2
(45) Date of Patent: Mar. 8, 2022

(54) CHANGE-PROTECTED DATABASE SYSTEM

(71) Applicant: Salesforce.com, Inc., San Francisco, CA (US)

(72) Inventor: Rohitashva Mathur, Walnut Creek, CA (US)

(73) Assignee: salesforce.com, Inc., San Francisco, CA (US)

( * ) Notice: Subject to any disclaimer, the term of this patent is extended or adjusted under 35 U.S.C. 154(b) by 307 days.

(21) Appl. No.: 16/525,818

(22) Filed: Jul. 30, 2019

(65) Prior Publication Data

US 2021/0034476 A1     Feb. 4, 2021

(51) Int. Cl.
*G06F 16/22*     (2019.01)
*G06F 16/23*     (2019.01)
*G06F 11/14*     (2006.01)

(52) U.S. Cl.
CPC ...... *G06F 11/1474* (2013.01); *G06F 11/1469* (2013.01); *G06F 16/2282* (2019.01); *G06F 16/2379* (2019.01); *G06F 2201/87* (2013.01)

(58) Field of Classification Search
None
See application file for complete search history.

(56) References Cited

U.S. PATENT DOCUMENTS

| | | | |
|---|---|---|---|
| 2009/0164525 A1* | 6/2009 | Krishnaswamy ... | G06F 16/2379 |
| 2013/0312097 A1* | 11/2013 | Turnbull ................. | G06F 21/55 |
| | | | 726/24 |
| 2015/0149704 A1* | 5/2015 | Lee ...................... | G06F 16/2358 |
| | | | 711/103 |
| 2015/0254286 A1* | 9/2015 | Dutta .................... | G06F 16/215 |
| | | | 707/609 |
| 2018/0025174 A1 | 1/2018 | Mathur et al. | |
| 2018/0060377 A1* | 3/2018 | Kulkarni ............... | G06F 16/252 |
| 2018/0107697 A1 | 4/2018 | Tariq et al. | |
| 2018/0107711 A1 | 4/2018 | Tariq et al. | |
| 2018/0107714 A1 | 4/2018 | Tariq et al. | |
| 2018/0114033 A1 | 4/2018 | Mathur | |
| 2018/0129691 A1 | 5/2018 | Mathur | |
| 2018/0150533 A1 | 5/2018 | Mathur | |
| 2019/0130002 A1 | 5/2019 | Mathur | |
| 2019/0138658 A1 | 5/2019 | Mathur | |

FOREIGN PATENT DOCUMENTS

WO     2018075839 A1     4/2018

* cited by examiner

*Primary Examiner* — Aleksandr Kerzhner
*Assistant Examiner* — Eddy Cheung
(74) *Attorney, Agent, or Firm* — Kwan & Olynick LLP

(57) ABSTRACT

A request to update an original data value in a first row in a database table in a database system. An updated data value is written to a second row in a staging table in the database system. The updated data value corresponds with the original data value. The first row includes a database table key, which is also included in the second row. The original data value in the database table is replaced with a corresponding replacement value, which is determined based on a value replacement update function that takes as input the updated data value. The staging table maintains a record value for reversing the update to the database table.

14 Claims, 15 Drawing Sheets

Entity Table

| | Col 1 | Col 2 | Col 3 | Col 4 |
|---|---|---|---|---|
| PK 1 | | | A | |
| PK 2 | | | B | |
| PK 3 | | | C | |
| PK 4 | | | A | |
| PK 5 | | | D | |
| PK 6 | | | E | |

602

Static Staging Table

| | Col 3 |
|---|---|
| PK 2 | b |
| PK 3 | c |
| PK 5 | d |

Entity Table

|  | Col 1 | Col 2 | Col 3 | Col 4 |
|---|---|---|---|---|
| PK 1 |  |  | A |  |
| PK 2 |  |  | B |  |
| PK 3 |  |  | C |  |
| PK 4 |  |  | A |  |
| PK 5 |  |  | D |  |
| PK 6 |  |  | E |  |

Temporal Staging Table

|  | $c_1$ | $c_2$ | $c_3$ | $c_4$ |
|---|---|---|---|---|
| PK 2 | b | c | C | A |
| PK 3 | c | d |  |  |
| PK 5 | d | e | E |  |
| PK 6 | e | f | F | A |

CHANGE-PROTECTED DATABASE SYSTEM

FIELD OF TECHNOLOGY

This patent document relates generally to database systems and more specifically to protecting changes to a database system.

BACKGROUND

Database systems store tabularized data in one or more tables. These database tables are updated via database scripts or application procedure interface (API) calls from applications. In some instances, a change to a database table may be unintended. For example, an application error or a malicious action may lead to the insertion, deletion, or alteration of data that is inconsistent with the intentions of a database user and/or administrator.

Unintended changes to a database system can create significant problems. For example, an unintended change to a user permissions table may result in unintentionally elevated user permissions, creating a security risk. As another example, valid data may be unintentionally overwritten.

Unintended changes may be reversed by restoring a database to an earlier state. However, an unintended change may be followed or preceded by one or more intended changes. In that case, restoring the database to a state prior to the unintended change may effectively eliminate one or more intended changes, thus creating additional problems.

BRIEF DESCRIPTION OF THE DRAWINGS

The included drawings are for illustrative purposes and serve only to provide examples of possible structures and operations for the disclosed inventive systems, apparatus, methods and computer program products for database system change protection. These drawings in no way limit any changes in form and detail that may be made by one skilled in the art without departing from the spirit and scope of the disclosed implementations.

FIG. 6 illustrates an arrangement of database data, configured in accordance with one or more embodiments.

DETAILED DESCRIPTION

Figure 1:
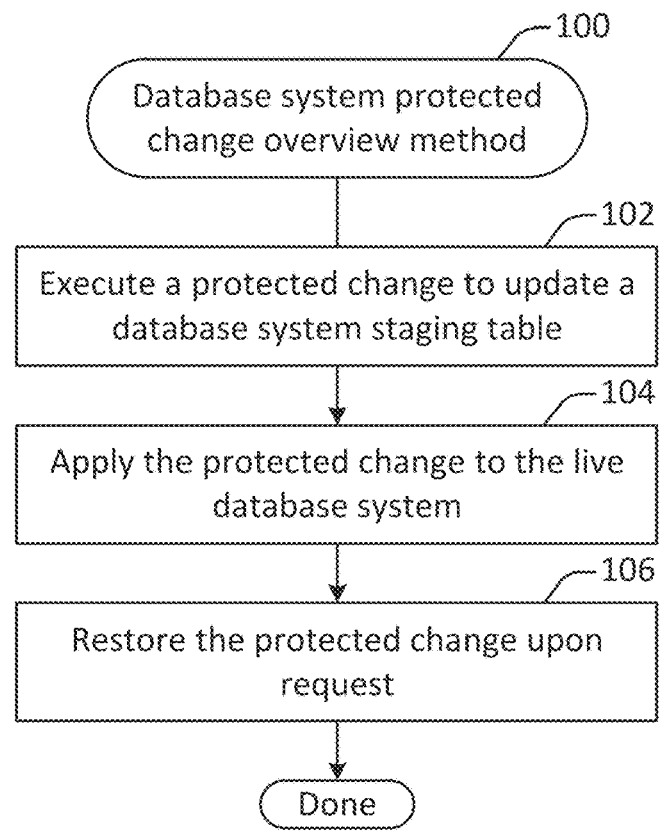
FIG. 1 illustrates an example of an overview method for executing a protected change to a database system, performed in accordance with one or more embodiments.

Techniques and mechanisms are described herein for "undoing" unintended changes to a database system and efficiently and quickly returning the database system to a desirable state. Unintended database changes may be caused in any of various ways. For instance, an application error or a malicious action may lead to the insertion, deletion, or alteration of data that is inconsistent with the intentions of a database user and/or administrator. Such changes can create significant problems. For example, an unintended change to a user permissions table may result in unintentionally elevated user permissions, creating a security risk. As another example, valid data may be unintentionally overwritten.

Because a database system is typically subject to a succession of changes over time, the term "undo" has several potential meanings when used with respect to one or more specific changes in a succession of changes.

In a first approach, an updated value may be "restored" to an original value prior to an unintended change. Such an approach may be desirable in some situations, for instance if the value was not updated again after the unintended change.

In a second approach, an updated value may be "restored" to a subsequent value after an unintended change. Such an approach may be desirable in some situations, for instance if a value that was unintentionally changed was later intentionally overwritten with a different value.

In a third approach, an updated value may be "restored" to a value that is a function of one or more data values. In this approach, the "restored" value may never have actually existed in the database in practice, but in some sense would or should have existed had the unintended change not occurred. Such an approach may be desirable in some situations, for instance if a value is subject to a sequence of modifications that depend on the previous value (e.g., successively incrementing a value).

In a fourth approach, an updated value may be left alone. Such an approach may be desirable in some situations, for instance if the unintended change to the value is not significant in a practical or business sense.

Which approach to use for a specific unintentional change may depend on any number of considerations. For example, the first approach may be preferable immediately after an unintended data change is made. However, the second or third approach may be more preferable as more time passes and a data value is altered through successive intended changes.

Consider the situation of Alex, an administrator of a database system in an on-demand computing services environment that stores data associated with many different organizations. In this example, an application update caused an application in the on-demand computing services environment to erroneously modify data in a user permissions table storing permissions data for hundreds of thousands of users. This unintended change was followed by a succession of intended changes to the same table.

Using conventional techniques, Alex may attempt to restore the table to a desired state by manually constructing a series of database scripts designed to undo the unintended change. However, the complexity introduced by the sequence of changes means that the precise consequences of each script are not immediately clear. Accordingly, Alex must also construct a backout script for each undo script in order to undo the consequences of the backout script if necessary. Given the urgency and severity of the problem, completely restoring the change involves several administrators working in concert over several days.

Using techniques and mechanisms described herein, the database system automatically applies protection to the change to the permissions table. The database system first executes the change to update a staging table rather than the live table. The change is then evaluated and flagged as problematic before it is even executed, thus avoiding the problem entirely. However, even if the change actually had been applied, Alex would have been able to easily and efficiently restore the change based on the data in the staging able.

FIG. 1 illustrates an example of an overview method 100 for executing a protected change to a database system, performed in accordance with one or more embodiments. According to various embodiments, the method 100 may be performed at a database system implemented on a server system.

At 102, a protected change is executed to update a database staging table. According to various embodiments, the change may be requested through a database script, a purpose-built database API, or any other suitable channel. Before updating the live database table, the changes are made to a staging table. Executing the change in this fashion may involve first reading from the live database table and then writing to the staging table. Additional details regarding the execution of a protected change are discussed with respect to the method 200 shown in FIG. 2 and the method 500 shown in FIG. 5. Example arrangements of tables and metadata in a database system configured to support protected changes are discussed with respect to FIGS. 3 and 4.

Figure 7:
FIG. 7 illustrates an arrangement of database data, configured in accordance with one or more embodiments.

At 104, the protected change is applied to the live database system. According to various embodiments, the change may first be evaluated within the database staging table. When the change is approved, it may be applied to the live table. Applying the change to the live table may involve executing an update function that takes as an input one or more values from the staging table and, optionally, the current value in the live table. Additional details regarding the application of protected changes are discussed with respect to the method 800 shown in FIG. 8. Example arrangements of data in live tables and staging tables in a database system are shown in FIGS. 6 and 7.

At 106, the protected change is restored upon request. If it is determined that the protected change was unintentional, then a request may be generated to restore the change. Additional details regarding the restoration of a protected database change are discussed with respect to the method 900 shown FIG. 9.

Undoing an unintentional change is further complicated by the presence of implicit relationships between tables. For instance, a first table may maintain a count of objects in a second table that meet some criteria, and this relationship may not be apparent from the database structure itself. Accordingly, an unintentional change to the second table may result in another unintentional change to the first table. Therefore, undoing a change to the second table may necessitate undoing a change to the first table. Additional details regarding the identification and application of dependency relationships in a change protected database system are shown and discussed with respect to FIGS. 10, 11, and 12.

Figure 2:
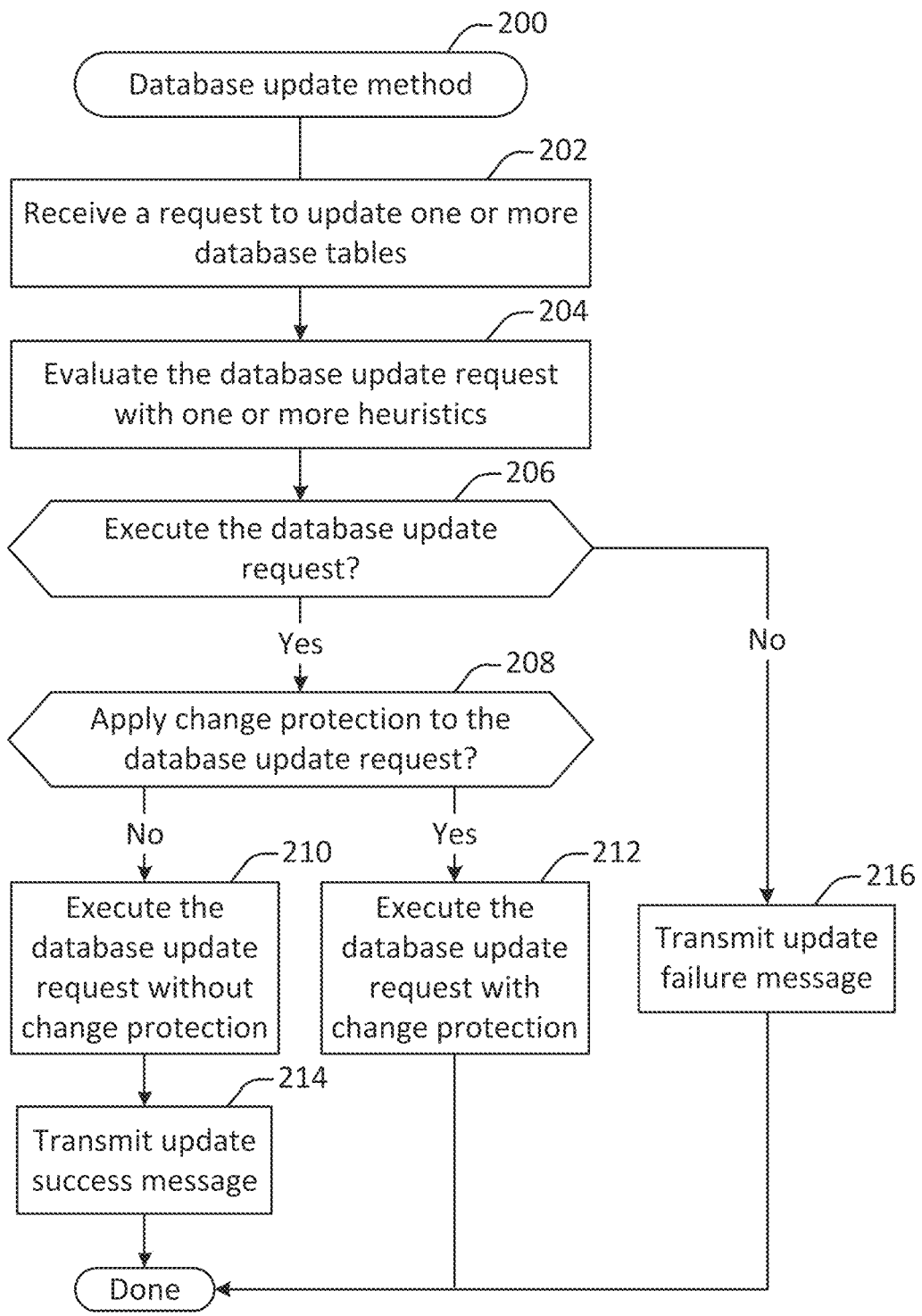
FIG. 2 illustrates a database staging table update method, performed in accordance with one or more embodiments.

FIG. 2 illustrates a database staging table update method 200, performed in accordance with one or more embodiments. According to various embodiments, the method 200 may be performed at a database system.

At 202, a request is received to update one or more database tables. In some implementations, the request may be implemented in the form of one or more database scripts. Alternately, or additionally, the request may include one or more API calls, for instance from an application implemented in an on-demand computing services environment.

At 204, the database update request is evaluated with one or more heuristics. According to various embodiments, the heuristics may be implemented in any suitable fashion. For example, the heuristics may be implemented as a set of rules defined by a database administrator. As another example, the heuristics may be implemented as part of a learning process whereby the database system observes requests over time and progressively identifies request characteristics that are indicative of potentially unintended database changes.

In some implementations, various types of heuristics may be used. For example, a determination may be made as to whether a database update request is consistent with past database update requests from the same source. As another example, a determination may be made as to the number of records and/or tables that the database update request is likely to access, with a greater number of records and/or tables affected increasing the likelihood that change protection is employed or that the database update request is not executed. As yet another example, a determination may be made as to the table or tables affected by the database update request. for instance, an edit to a user permissions table may be more likely to trigger change protection or result in the request being denied than a change to a less sensitive database table. In some implementations, heuristics may vary based on the table and/or table columns being updated.

At 206, a determination is made as to whether to execute the database update request. According to various embodiments, the determination may be made at least in part on the evaluation performed in operation 204. Alternately, or additionally, the determination may be made at least in part based on user input. For instance, a database administrator may evaluate the request and provide an indication as to whether to execute the request.

In some implementations, the determinations made at 206 may reflect a number of considerations. For example, a decision may be made to not execute the database update request or to apply change protection if the content of the request seems risky, even if the source of the request is trusted. As another example, a decision may be made to not execute the database update request or to apply change protection if the source of the request is entrusted, even if the content of the request seems consistent with intentional changes. As still another example, a decision may be made to not execute the database update request or to apply change protection if the request is associated with a recently-updated application. For instance, changes by a recently-updated application may be monitored for a period of time (e.g., 12 hours) after the update is implemented.

At 208, a determination is made as to whether to apply change protection to the database update request. According to various embodiments, the determination may be made at least in part on the evaluation performed in operation 204. Alternately, or additionally, the determination may be made at least in part based on user input. For instance, a database administrator may evaluate the request and provide an indication as to whether to execute the request with change protection.

At 210, the database update request is executed without change protection. According to various embodiments, executing the database update request without change protection may involve executing the database update request against the live database table or tables without writing to a staging table.

At 212, the database update request is executed with change protection. Techniques and mechanisms for executing the database update request with change protection are discussed elsewhere herein, such as with respect to the methods 500 and 600 shown in FIGS. 5 and 6.

At 214, an update success message is transmitted if the database update request is executed without change protection. At 216, an update failure message is transmitted if it is determined to not execute the database update request. According to various embodiments, the message may be sent to the source of the database update request. For example, the message may be sent to the source of the database script or the application that transmitted the request at 202.

Figure 3:
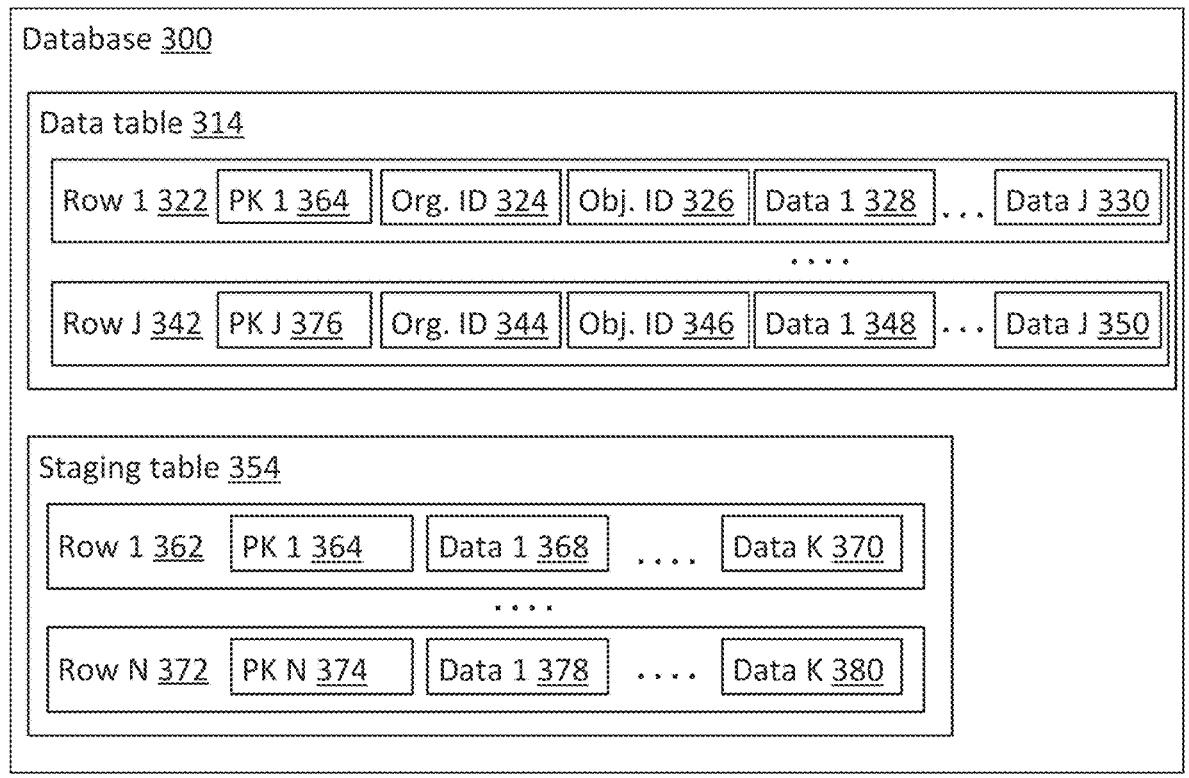
FIG. 3 illustrates an example of a database, configured in accordance with one or more embodiments.

FIG. 3 illustrates an example of a database 300, configured in accordance with one or more embodiments. According to various embodiments, a database may include one or more data tables and one or more staging tables. For example, the database 300 includes the data table 314 and the staging table 354. As discussed herein, for instance with respect to the method 300 shown in FIG. 3, live data accessible to users is stored in database tables. Staging tables store information such as data for protected changes that have not yet been applied to the live database tables, or data for restoring protected changes that have already been applied to the live database tables.

The data table 314 is one example of a data table. According to various embodiments, each data table may include one or more rows, with each row corresponding to a database entry. For instance, if a database stores information associated with a customer relations management (CRM) system, a given database entry may be associated with a customer of an organization, a contact at such a customer, or a sale made to such a customer. In FIG. 3, the data table 314 includes the rows 322-342.

According to various embodiments, in a multi-tenant configuration each row may include an organization identifier. For example, the rows 322 and 342 include the organization identifiers 324 and 344. Each organization identifier identifies the organization that owns the data stored in the corresponding row. For example, an organization identifier may correspond with a tenant in a multi-tenant database.

In particular embodiments, techniques and mechanisms described herein may be applied to databases or database tables that are not organized in a multi-tenant configuration. In a single-tenant configuration, a database row may not include an organization identifier.

According to various embodiments, each row may include an object identifier in a dynamic schema database. For example, the rows 322 and 342 include the object identifiers 326 and 346. Each object identifier identifies the object definition associated with the database row. For example, one row of a database may correspond with a customer of an organization, while another row of a database may correspond with a contact person at that customer. In this example, the two rows would have different object identifier values that identified the definition of a customer object and a contact object respectively.

In particular embodiments, techniques and mechanisms described herein may be applied to databases or database tables that are not organized in a dynamic schema configuration. In a single-tenant configuration, a database row may not include an object identifier.

In some embodiments, each row may include a number of data fields. For example, the rows 322 and 342 include the data fields 328-330 and 348-350 respectively. Each data field may store a data value for the database entry represented by the row. For example, if a database row corresponds with a customer of an organization, data fields within that row may store information such as the customer name, customer address, customer phone number, date in which the customer was added to the database, and other such customer-level information.

In some implementations, such as dynamic-schema database configurations, the same data field may store different types of information in different rows. For example, if the row 1 322 corresponds with a customer of an organization, the data field 1 328 may store the customer name. In this example, if the row J 342 corresponds with a contact person at that customer, then the data field 1 348 may correspond with the phone number of the contact person.

According to various embodiments, in dynamic-schema database configurations, the information stored in a particular data field may be defined according to one or more metadata entries. Techniques and mechanisms associated with metadata entries that support dynamic-schema database configurations are discussed throughout the application, and more specifically with respect to FIG. 4.

In particular embodiments, not all data values need to be filled for each database entry. For example, a database table may be configured with a fixed number of fields, such as 100 or 1,000. However, an individual database entry may be associated with an object definition that only employs 50 data fields. For such a database entry, only 50 data fields may be filled even though the row includes space for more.

According to various embodiments, a data table row may include one or more keys. For instance, the row 1 322 includes the primary key 1 364, while the row J 342 in the data table includes the primary key J 376.

The staging table 354 is one example of a staging table. According to various embodiments, a staging table corresponds to a live table in the database. For example, in FIG. 3, the staging table 354 corresponds to the data table 314.

According to various embodiments, a staging table row may include one or more keys. For instance, the row 1 362 includes the primary key 1 364, while the row N 372 in the data table includes the primary key N 374.

In some implementations, each row in the staging table may correspond with a row in the data table. The rows may be linked by a key. For example, the row 1 322 in the data table 314 corresponds to the row 1 362 in the staging table, with the two rows being linked by the primary key 364.

In some implementations, a staging table may contain data values created based on a protected change to a database. For instance, as discussed with respect to FIGS. 2 and 5, a staging table may be created when a protected change is executed.

According to various embodiments, the staging table may include some or all of the columns included in the corresponding data table. For instance, the staging table may include columns that contain values updated by the protected change associated with the staging table, but may omit columns that contain values that are not updated by the protected change associated with the staging table.

In some implementations, the staging table may include rows corresponding to some or all of the rows in the corresponding data table. For instance, the staging table may include rows that contain values updated by the protected change associated with the staging table, but may rows columns that contain values that are not updated by the protected change associated with the staging table. Because the staging table may be configured to include only rows and columns actually affected by the protected change, the staging table is in a sense a "thin" version of the data table.

In some implementations, the staging table may include one or more additional columns not shown in FIG. 3. For example, the staging table may include a column storing an indication of a Data Manipulation Language (DML) operation or other indication of operation type. Such a column may indicate, for instance, whether the operation represents an update of, deletion from, or insertion into the base table.

Figure 4:
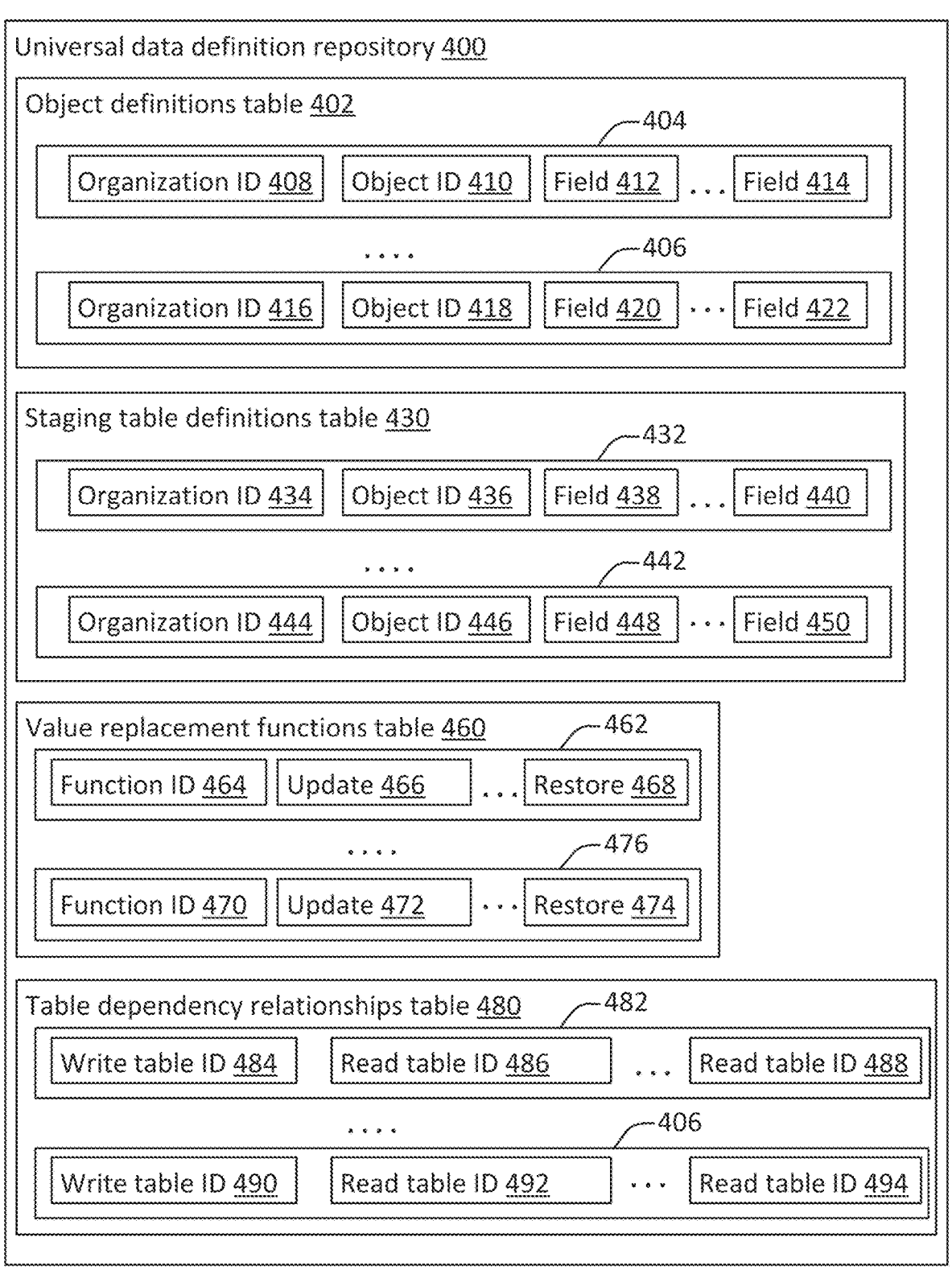
FIG. 4 illustrates an example of a universal data definition repository, configured in accordance with one or more embodiments.

FIG. 4 illustrates an example of a universal data definition repository 400, configured in accordance with one or more embodiments. In some implementations, the universal data definition repository 400 includes definitions for tables, functions, relationships, and other metadata characteristics associated with a database system.

The universal data definition repository 400 includes an object definition table 402. The object definition table 402 stores object definitions for dynamic-schema database objects that may be stored within a database table. The object definition table 402 includes the object definitions 404 through 406. Each object definition entry includes an object identifier that identifies the object defined by the object definition. For example, the object definitions 404 and 406 include the object identifiers 408 and 418.

According to various embodiments, in a multi-tenant configuration an object definition entry may include an organization identifier. For example, the object definitions 404 and 406 include the organization identifiers 406 and 416. The presence of an organization identifier may allow for the creation of organization-specific object definitions. For example, a standard customer object may include a designated set of fields. However, different organizations may wish to expand the standard customer object to include additional, organization-specific fields.

In some implementations, an object definition entry may include one or more field data definitions. For example, the object definitions 404 and 406 include the field data definitions 410-412 and 420-22. Each field definition may identify the information included in a designated data field in a database entry corresponding to the identified object. For example, if the object definition entry 404 corresponds to a custom definition of a customer object, then the field 410 may indicate that the data J 330 field in Row 1 322 in FIG. 3 stores an organization-specific customer type field for the customer. In this example, the field is specific to the organization associated with the organization ID 408.

In particular embodiments, each object definition entry may include all field data definitions for a given object and organization. Alternately, each object definition entry may include a single field definition for a given object and organization, with each object and organization having a separate field object definition entry for each field.

In some implementations, database tables or metadata tables such as those shown in FIGS. 4 and 4 may include elements that are not depicted in those figures. For example, database tables commonly include index values to facilitate more efficient storage and retrieval and/or queries such as join operations.

The universal data definition repository 400 includes a staging table definitions table 430. According to various embodiments, the staging table definitions table 430 may maintain definitions for staging tables created to capture protected changes. Each staging table definition may include information about the contents of the associated staging table. Since a staging table corresponds to a live data table, the entries in the staging table definitions table 430 may be similar to the entries in the object definitions table 402.

In the example shown in FIG. 4, the staging table definitions table 430 includes the staging table definitions 432 through 442. According to various embodiments, in a dynamic schema configuration each staging table definition entry includes an object identifier that identifies the object stored in the staging table defined by the staging table definition. For example, the staging table definitions 432 and 442 include the object identifiers 436 and 446.

According to various embodiments, in a multi-tenant configuration staging table definition entry may include an organization identifier. For example, the staging table definitions 432 and 442 include the organization identifiers 434 and 444.

In some implementations, a staging table definition entry may include one or more field data definitions. For example, the staging table definitions 432 and 442 include the field data definitions 438-440 and 446-450. As in the object definition table, each field definition may identify the information included in a designated data field in a staging table entry corresponding to the identified object. However, because staging tables may include only those columns that contain values that are actually updated by a protected change, an entry in the staging table definitions table 430 may include fewer data columns than the corresponding entry in the object definitions table 402.

The universal data definition repository 400 includes a value replacement functions table 460. According to various embodiments, each entry in the value replacement functions table includes a value replacement function. Each function may be represented by a function identifier. For example, the function entry 462 is associated with the identifier 464, while the function entry 476 is associated with the function identifier 470.

In some implementations, each entry in the value replacement functions table includes both an update function and a restore function. For example, the function entry 462 includes the update function 466 and the restore function 468, while the function entry 476 includes the update function 472 and the restore function 474.

According to various embodiments, a value replacement update function may take as an input a value in a live entity table and/or one or more corresponding values in a staging table. The value replacement function update may then output an updated value for the live entity table and/or an updated value for the staging table.

According to various embodiments, any suitable value replacement update functions may be used. For example, a swap function may simple swap each updated value in the live entity table with its corresponding value in a static or temporal staging table. As another example, an increment function may increment values in a live entity table by the corresponding values stored in the staging table.

In some implementations, the value replacement restore function reverses (i.e. inverts) the effect of the value replacement update function. Similar to the update function, the restore function takes as an input a value in a live entity table and/or one or more corresponding values in a staging table and then outputs a restored value for the live entity table and/or an updated value for the staging table. For example, a swap function is its own inverse, since performing a swap twice leaves the original values in place. As another example, a decrement function is the inverse of an increment function.

In some embodiments, the value replacement function may be specified by an administrator. For example, a database administrator may author both a value replacement update function and a corresponding value replacement restore function.

The universal data definition repository 400 includes a table dependency relationships table 480. The table dependency relationships table 480 includes one or more entries that each correspond to a table dependency relationship identified as discussed with respect to the methods 11 and 1200 shown in FIGS. 11 and 12. Each data dependency relationship entry may specify information such as an identifier associated with the table being written to and one or more identifiers associated with tables being read from. As discussed with respect to FIG. 12, when a change to a table identified in a dependency relationship as a "write table" is made, subsequent changes to the associated "read tables" may be protected.

According to various embodiments, the tables included in the universal data definition repository 400 are configured to facilitate the management of one or more multi-tenant, dynamic-schema database tables such as the table discussed with respect to FIG. 3. In some implementations, a universal data definition repository 400 may include additional tables not shown in FIG. 4, or may include tables arranged in a different configuration than that shown.

Figure 5:
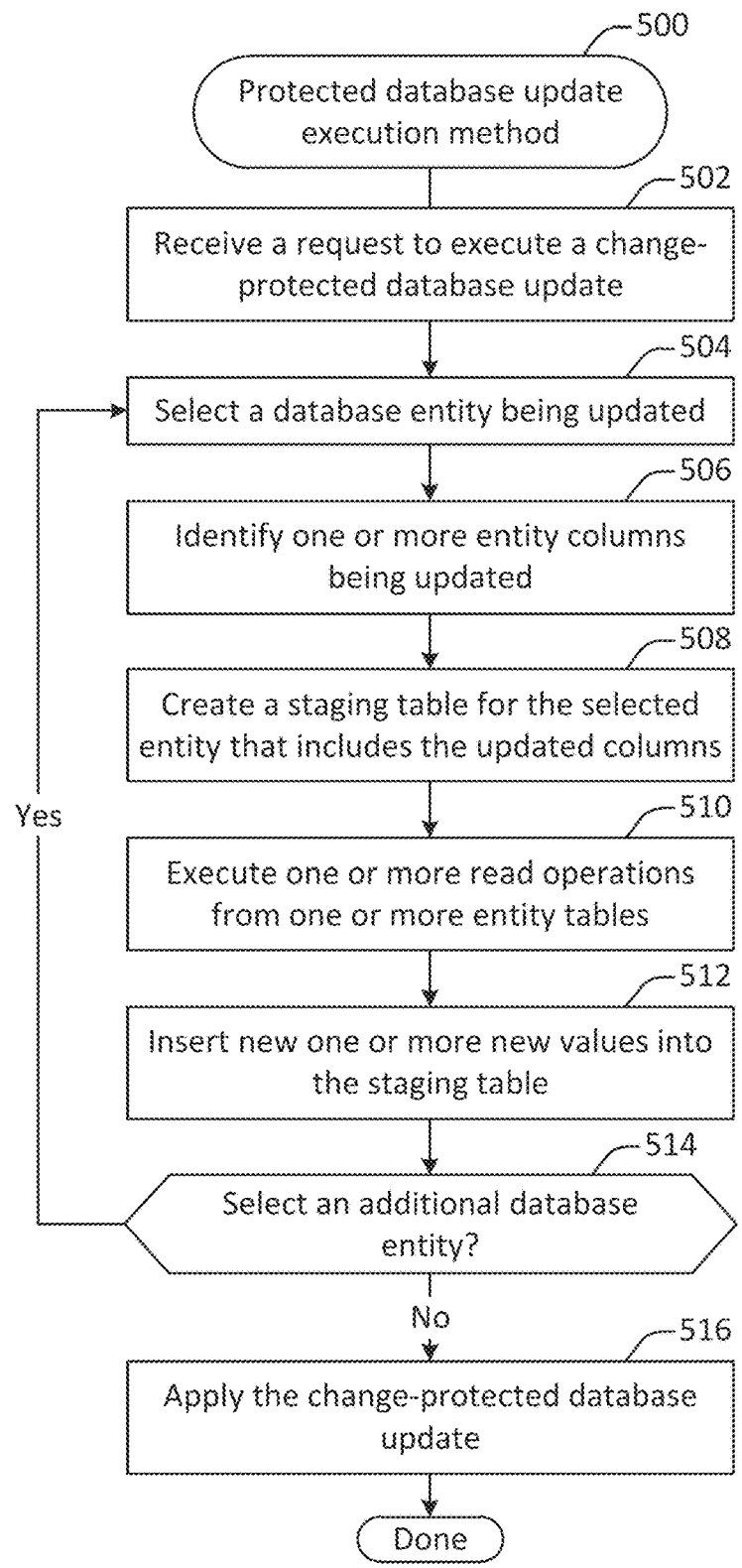
FIG. 5 illustrates a database update execution method, performed in accordance with one or more embodiments.

FIG. 5 illustrates a database update execution method 500, performed in accordance with one or more embodiments. According to various embodiments, the method 500 may be performed at a database system.

At 502, a request is received to execute a change-protected database update. For instance, the method 500 may be performed when it is determined at the operation 212 shown in FIG. 2 to execute a database update request with change protection.

A database entity updated by the change-protected database update request is identified at 504. According to various embodiments, the updated database entity may be identified by analyzing the API request and/or database update script to identify an entity associated with a write request. For instance, a database update instruction may include a portion such as "INSERT INTO customer (name) VALUES (NewCo)". In such an instruction, the "customer" entity is being updated.

One or more entity columns being updated are identified at 506. In some implementations, the one or more entity columns being updated may be identified by analyzing the API request and/or database update script to determine fields associated with changed values. For instance, a database update instruction may include a portion such as "UPDATE customer SET type='preferred' AND class='top' WHERE age>5". In such an instruction, the "type" and "class" fields of the "customer" entity are being updated.

A staging table for the selected entity is created at 508. According to various embodiments, the staging table may be created by consulting the entity definitions table associated with the entity table identified at operation 504. The staging table may include the columns identified at operation 508, as well as one or more other columns such as a primary key column, an object identifier column, and/or an organization identifier column.

In some implementations, the staging table may be empty upon creation. That is, the staging table may include the columns discussed with respect to operation 508, but may not contain any rows.

At 510, one or more read operations are executed from one or more entity tables. According to various embodiments, executing the one or more read operations from the one or more entity tables may involve retrieving any values from the entity tables or any other suitable tables necessary to subsequently execute the write portion or portions of the request. For example, when executing the database request "UPDATE customer SET type='preferred' AND class='top' WHERE age>5", the live customer database datable may be queried to identify primary keys for all rows where the value stored in the age field exceeds 5.

At 512, one or more values are inserted into the staging table. According to various embodiments, executing the change-protected database update request may involve writing one or more values to the staging table instead of the corresponding live database entity table. Executing the change-protected database update request may involve implementing an insert request rather than an update request. For example, were the database request "UPDATE customer SET type='preferred' AND class='top' WHERE age>5" to be executed against a live database table (i.e. unprotected), then existing rows would be updated. However, when executing the write portion of this request against the staging table, new rows are inserted because the staging table is empty when it is created. Further, because the staging table is a thin copy of the corresponding entity table, the only columns included in the insert request are the "type" and "class" columns, even if the actual customer entity includes more columns.

Accordingly, executing a change-protected database request may involve re-writing a database query, for instance to target different tables. For instance, as a simple example the database request "UPDATE customer SET type='preferred' AND class='top' WHERE age>5" may be rewritten as "INSERT INTO customer_staging (customer_key, type, class) VALUES (SELECT customer_key, 'preferred', 'top' FROM customer WHERE age>5)".

A determination is made at 514 as to whether to select an additional database entity for analysis. According to various embodiments, a single database update request may include updates to different entities. If this is the case, then each entity updated may be protected. Although FIG. 5 shows different entities being updated in sequence (e.g., in a loop), in practice the operation shown in FIG. 5 may be performed in any suitable order. For example, staging tables may be created for all entities being updated. Then, read requests may be performed against the live database tables and write requests may be performed against the staging tables as needed.

The change-protected database update is applied at 516. Techniques and mechanisms associated with the application of a change-protected database update to a live database table are discussed in additional detail elsewhere herein, such as with respect to the method 800 shown in FIG. 8.

FIG. 6 illustrates an arrangement of database data 600, configured in accordance with one or more embodiments. The arrangement of database data 600 is a simple example with a limited number of rows, columns, and values intended to illustrated techniques and mechanisms described herein. In practice, database tables configured in accordance with these techniques and mechanisms may include virtually any number of rows and columns, subject to hardware constraints.

The entity table 602 shown in FIG. 6 represents a live database table. The table 602 is storing rows associated with 6 different entities. Each entity is associated with four different fields, represented by columns 1-4.

The static staging table 652 shown in FIG. 6 corresponds to a single change-protected update. For subsequent change-protected updates, a different staging table may be created. The static staging table 652 is created in response to a request to apply a change-protected update to the entity table 602. For example, the change-protected update may include a query to set the value in column 3 to lowercase wherever the value is equal to B, C, or D. Because the change-protected update only affects the values in column 3, the staging table 652 only includes column 3 and not columns 1, 2, or 4.

When the static staging table 652 is created, it is initially empty. Executing the change-protected update thus involves first reading from the entity table 602 to identify primary keys and column 3 values where the column 3 value is equal to B, C, or D. Such a request would identify the pairs (PK 1, A), (PK 3, C), and (PK 5, D). Executing the change protected update would then involve determining the updated column 3 values, which in this example are lowercase versions of the retrieved column 3 values. The updated values along with the corresponding primary keys are then inserted into the static staging table 652. Thus, the rows (PK 1, a), (PK 3, c), and (PK 5, d) are inserted into the static staging table 652.

FIG. 7 illustrates an arrangement of database data 700, configured in accordance with one or more embodiments. The arrangement of database data 700 is a simple example with a limited number of rows, columns, and values intended to illustrated techniques and mechanisms described herein. In practice, database tables configured in accordance with these techniques and mechanisms may include virtually any number of rows and columns, subject to hardware constraints.

The arrangement of database data 700 includes an entity table 602 identical to the entity table shown in FIG. 6. However, the temporal staging table 752 shown in FIG. 7 differs from the static staging table 652 in several ways. According to various embodiments, the temporal staging table 752 is capable of recording a succession of changes rather than a single static change. The temporal staging table 752 may also be referred to as a temporal entity table because in some configurations it can store successive values of entity fields.

According to various embodiments, the temporal staging table may be accessible via a high-level API (e.g., in Java). Using such an API, administrators may perform complex restore operations without the need for complex one-time scripts. Further, restoration operations may then be defined as function references in the universal data definition repository to facilitate performing restoration operations automatically. For example, once completed, a restoration operation that involves the implementation of one or more different restore functions may be implemented as a script that includes a succession of API calls. The restoration operation may then be repeated at a later time in a similar situation.

The columns shown in the temporal staging table 752 represent successive changes to the values stored in the temporal staging table. When a value is updated, a new value is inserted and the old value is retained rather than replaced. The new value is associated with a change identifier so that the temporal staging table can be used to determine the values stored in the table before and after a designated change has been made.

For example, the first change corresponds to a query where all values of column 3 that are not equal to "A" are changed to lowercase. As with FIG. 6, executing this query involves first reading the values from the entity table 602, updating the values, and then writing the updated values to the temporal staging table. The first change corresponds to the c1 column.

The next change to the table corresponds to a query where all values of column 3 that are not equal to "A" are incremented by one letter (i.e. b to c, c to d, d to e, and e to f). Executing this change involves reading from both the entity table and the temporal staging table, determining the updated values, and then inserting the updated values in the temporal staging table in the association with the c2 change indicator.

The next change to the table corresponds to a query where all values of column 3 that are not equal to "A" or "d" are converted to uppercase. Executing this change involves reading from both the entity table and the temporal staging table, determining the updated values, and then inserting the updated values in the temporal staging table in the association with the c3 change indicator.

The final change to the table corresponds to a query where all values of column 3 that are equal to "C" or "F" are replaced with "A". Executing this change involves reading from both the entity table and the temporal staging table, determining the updated values, and then inserting the updated values in the temporal staging table in the association with the c4 change indicator.

According to various embodiments, the temporal staging table 752 may be implemented using any of a variety of approaches. For example, the temporal staging table 752 may be implemented as a temporal database. As another example, the temporal staging table 752 may be implemented as a conventional database that includes a sequence field that stores a sequence value identifying the position of the associated field in relation to other updates to that field. Thus, although the change identifier is shown as a column in the temporal staging table 752 in FIG. 7, in practice the temporal staging table may be implemented in a variety of ways so long as the sequence of changes to the table is maintained.

Figure 8:
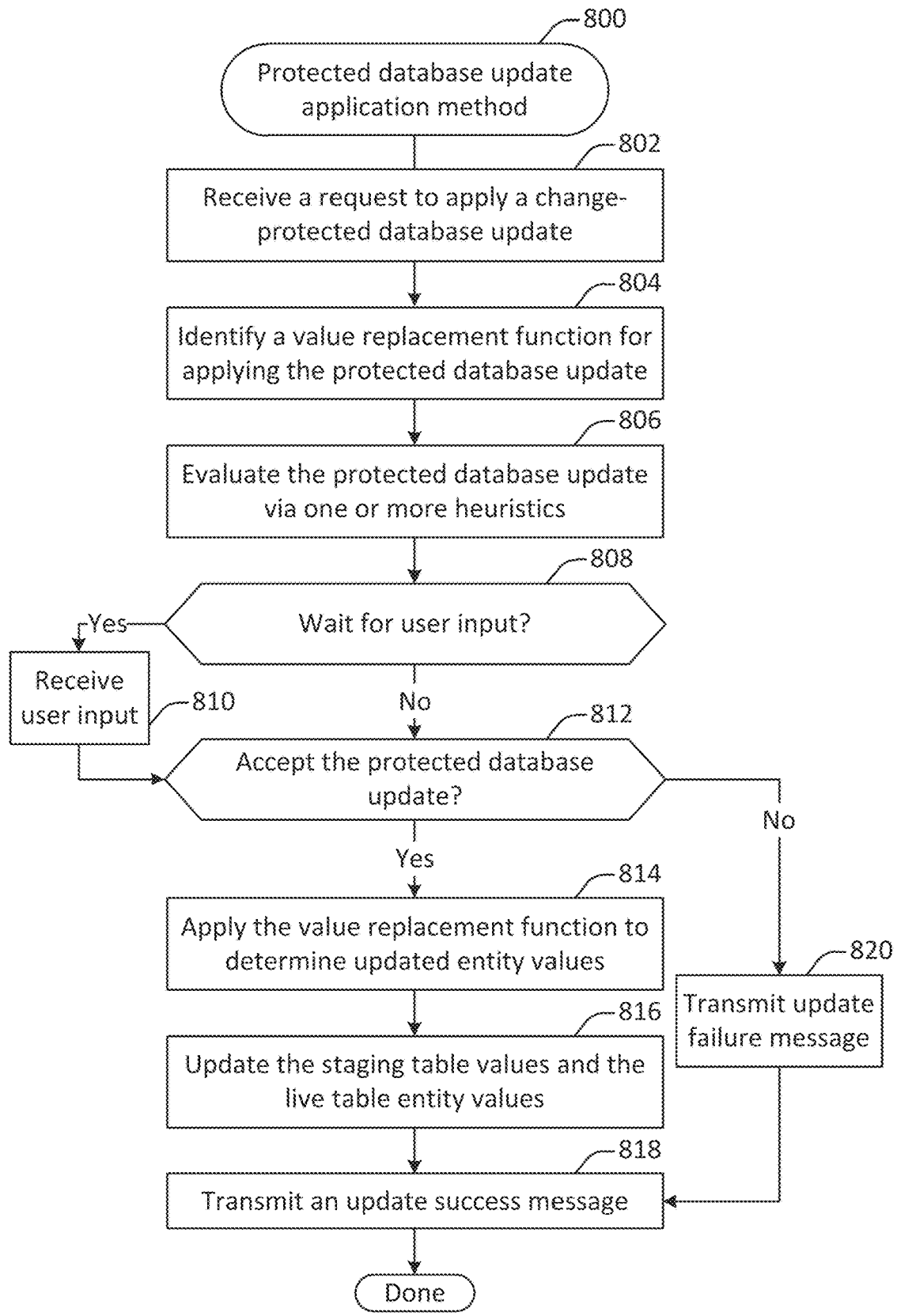
FIG. 8 illustrates a method for applying a protected change to a database table, performed in accordance with one or more embodiments.

FIG. 8 illustrates a method 800 for applying a protected change to a database table, performed in accordance with one or more embodiments. According to various embodiments, the method 800 may be performed at a database system.

A request is received at 802 to apply a change-protected database update. According to various embodiments, the request may be generated as discussed with respect to the operation 516 shown in FIG. 5.

A value replacement update function for applying the protected database update is identified at 804. According to various embodiments, a value replacement function entry may be identified by querying the value replacement functions table 460 shown in FIG. 4.

In some implementations, the value replacement function may be determined automatically, for instance based on the type of update being applied. For example, a simple swap function may be used when the protected update simply replaces existing values in the live database table with new values included in the updated. As another example, an increment function may be used when the protected update includes a request to increment existing values in the live database table.

In some embodiments, the value replacement function may be determined based on user input. For example, a database administrator may evaluate the protected database update and indicate a value replacement function to use.

The protect database update is evaluated via one or more heuristics in 806. According to various embodiments, the heuristics may include one or more rules specified by a database administrator. Alternately, or additionally, the heuristics may be learned by the database system over time. In some implementations, heuristics may vary based on the table and/or table columns being updated.

In some implementations, the heuristics may evaluate the change being made by the protected update as represented in the staging table. For example, a number of rows included in the database table may be compared to a number of rows in the live entity table. If the number of rows being updated is large in a relative or absolute sense, then the change may be identified as having a higher risk of being unintentional. As another example, the type of table being updated may be evaluated. For instance, a change to a permission table or other high-security table may be identified as having a higher risk of being unintentional. As still another example, the change may be compared with past changes associated with the same table, organization identifier, or other such characteristics. If the requested change is inconsistent with past changes, the change may be identified as having a higher risk of being unintentional.

In some implementations, the evaluation of the protected database update may yield a risk value. The risk value may be compared with one or more designated thresholds to determination whether to perform actions such as requiring user input or rejecting the update entirely.

A determination is made at 808 as to whether to wait for user input. If so, then user input is received at 810. According to various embodiments, the determination may be made at least in part on the evaluation performed at operation 806. For example, if an evaluation of a risk profile associated with the change-protected database update exceeds a designated threshold, then an administrator may be asked to manually confirm the update before applying it. Such a situation may involve, for example, a large-scale modification of a permissions table.

A determination is made at 812 as to whether to apply the protected database update. According to various embodiments, the determination may be made based on one or more of the user input received at 810 and the evaluation performed at the operation 806. For example, if an evaluation of a risk profile associated with the change-protected database update exceeds a designated threshold, then the update may be rejected.

At 814, the value replacement update function is applied to determine updated entity values. The updated entity values may include updated live table values and, optionally, updated staging table values. In some configurations, a single value replacement function may output values for both the live table and the staging table. Alternately, different value replacement functions may output the values for the staging table and the live table.

According to various embodiments, a value replacement function may take as input the values in the staging table and/or the corresponding values in the live entity table. For example, a simple swap function may replace the live entity table values with the corresponding swap table values, and replace the swap table values with the corresponding live entity table values. Such an approach may be preferable when, for example, the database update request represents a simple replacement of existing values with new values.

As another example, an increment function may replace live entity values with updated versions incremented by an increment specified in the staging table. The staging table values may then be left unchanged. Such an approach may be preferable when, for example, the database update request represents a request to increment existing database tables by some amount.

As still another example, a temporal replacement function may replace the existing live entity values with updated versions selected from a temporal staging table. The temporal staging table values may then be left alone to provide a record of the database at an earlier point in time.

At 816, the staging table values and the live table entity values are updated. According to various embodiments, the values may be updated with the updated entity values determined at 814. For example, in the example shown in FIG. 6, the column 3 values for PK 2, PK 3, and PK 5 in the entity table may be swapped with the corresponding values in the static staging table. As another example, in the example shown in FIG. 7, applying the next change in a sequence may involve replacing the entity table values with the corresponding temporal staging table values, while leaving the temporal staging table values intact.

At 818, an update success message is transmitted if the database update request is applied. At 820, an update failure message is transmitted if it is determined to not apply the database update request. According to various embodiments, the message may be sent to the source of the database update request. For example, the message may be sent to the source of the database script or the application that transmitted the request at 202.

According to various embodiments, the operations shown in FIG. 8 may be performed in an order different than that shown. For example, one or more operations may be performed in parallel. As another example, the value replacement function may be determined after a determination is made to accept the protected database update.

Figure 9:
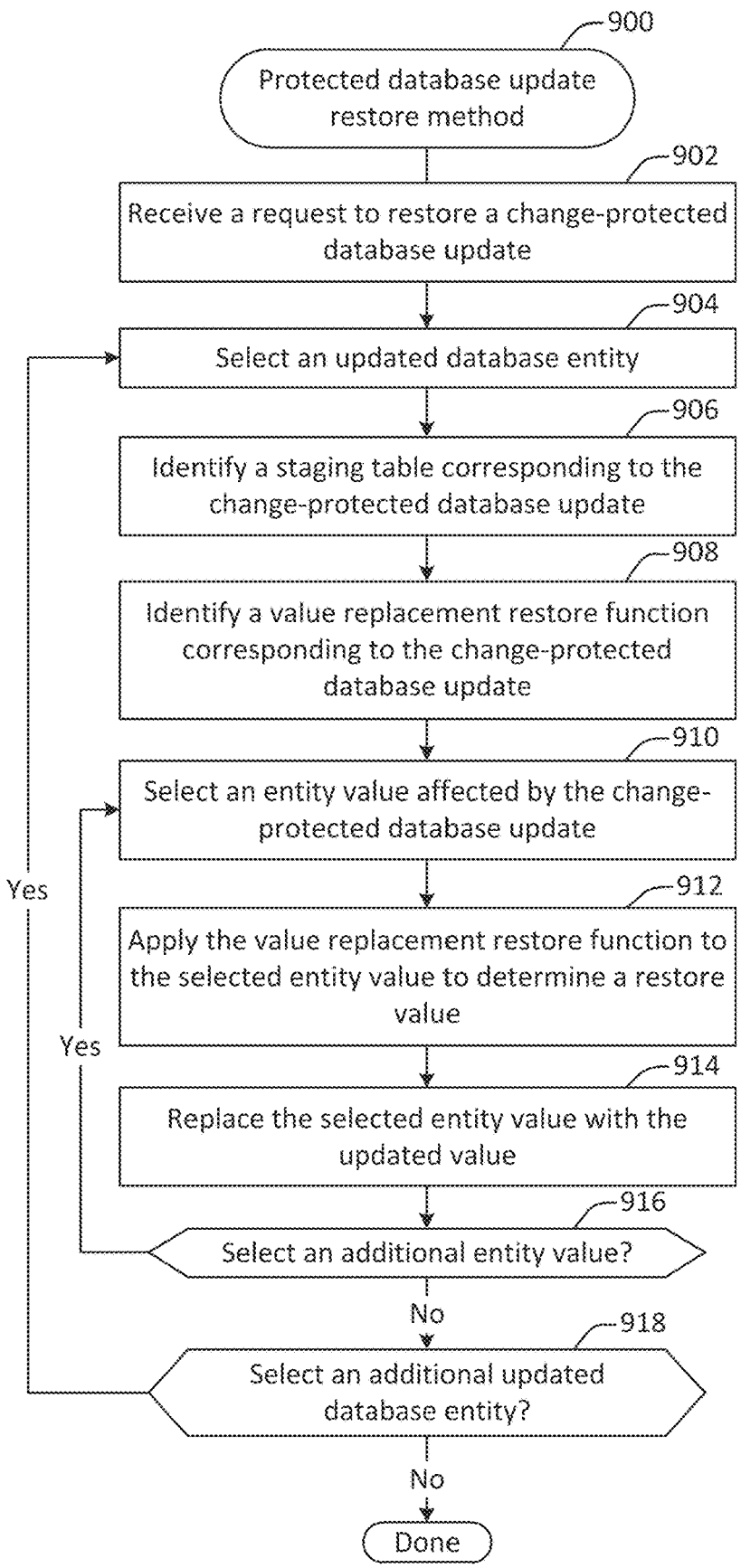
FIG. 9 illustrates a method for restoring a protected change to a database table, performed in accordance with one or more embodiments.

FIG. 9 illustrates a method 900 for restoring a protected change to a database table, performed in accordance with one or more embodiments. According to various embodiments, the method 900 may be performed at a database system.

At 902, a request is received to restore a change-protected database update. In some implementations, the request may be generated based on user input. For example, an administrator may notice that the data in a database table is incorrect and identify the change that created the erroneous data as unintended.

At 904, a database table updated by the unintended change-protected database update is selected. According to various embodiments, tables may be selected for restoration in sequence, in parallel, or in any suitable order.

A staging table corresponding to the protected database update is identified at 906, and a value replacement restore function corresponding to the change-protected database update is identified at 908. In some implementations, the staging table and value replacement restore function may be identified by querying the universal data definition repository 400 shown in FIG. 4.

An entity value affected by the change-protected database update is selected at 910. According to various embodiments, affected entity values may be selected in sequence, in parallel, or in any suitable order.

The value replacement restore function is applied to the selected entity value to determine a restore value at 912. According to various embodiments, the value replacement restore function may invert the change created by the value replacement update function that originally updated the database value. For example, as discussed with respect to FIGS. 4 and 8, the value replacement restore function may swap, decrement, or perform some other operation on the live entity and/or staging table values to produce the updated value.

The selected entity value is replaced with the updated value at 914. In some implementations, the value that has been replaced may be copied to a different table, for instance to provide a record of the restoration.

At 916, a determination is made as to whether to select an additional entity value affected by the change-protected database update. According to various embodiments, additional entity values may be selected until all affected values have been restored.

A determination is then made at 918 as to whether to select an additional updated database entity. In some implementations, additional database entities may be selected until all affected database entities have been restored.

Figure 10:
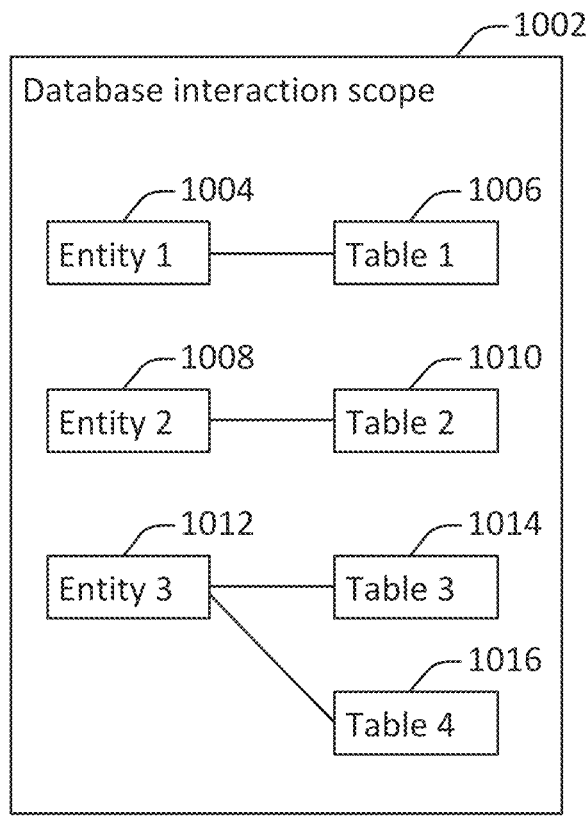
FIG. 10 illustrates an example of a database interaction scope, arranged in accordance with one or more embodiments.

FIG. 10 illustrates an example of a database interaction scope 1002, arranged in accordance with one or more embodiments. According to various embodiments, the database interaction scope 1002 represents one or more database requests that are linked together in some fashion. For example, the database interaction scope 1002 includes reads and/or writes to the entities 1 1004, 2 1008, 3 1012.

According to various embodiments, each entity represents a unit of logical data that may in practice be stored in one or more tables. For example, the entities included in the database interaction scope 1002 include data stored in tables 1 1006, table 2 1010, table 3 1014, and table 4 1016.

Figure 11:
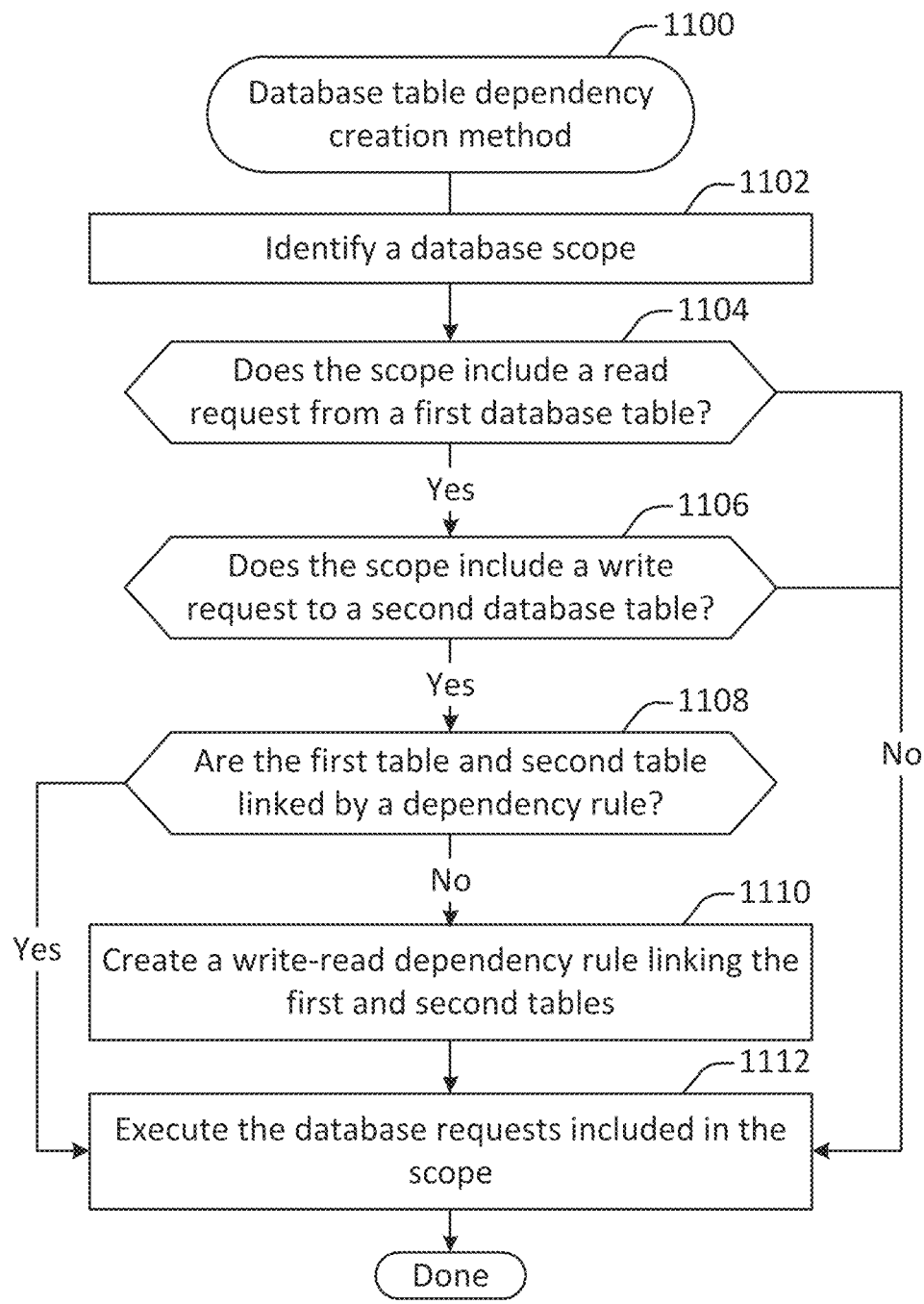
FIG. 11 illustrates a database table dependency creation method, performed in accordance with one or more embodiments.
Figure 12:
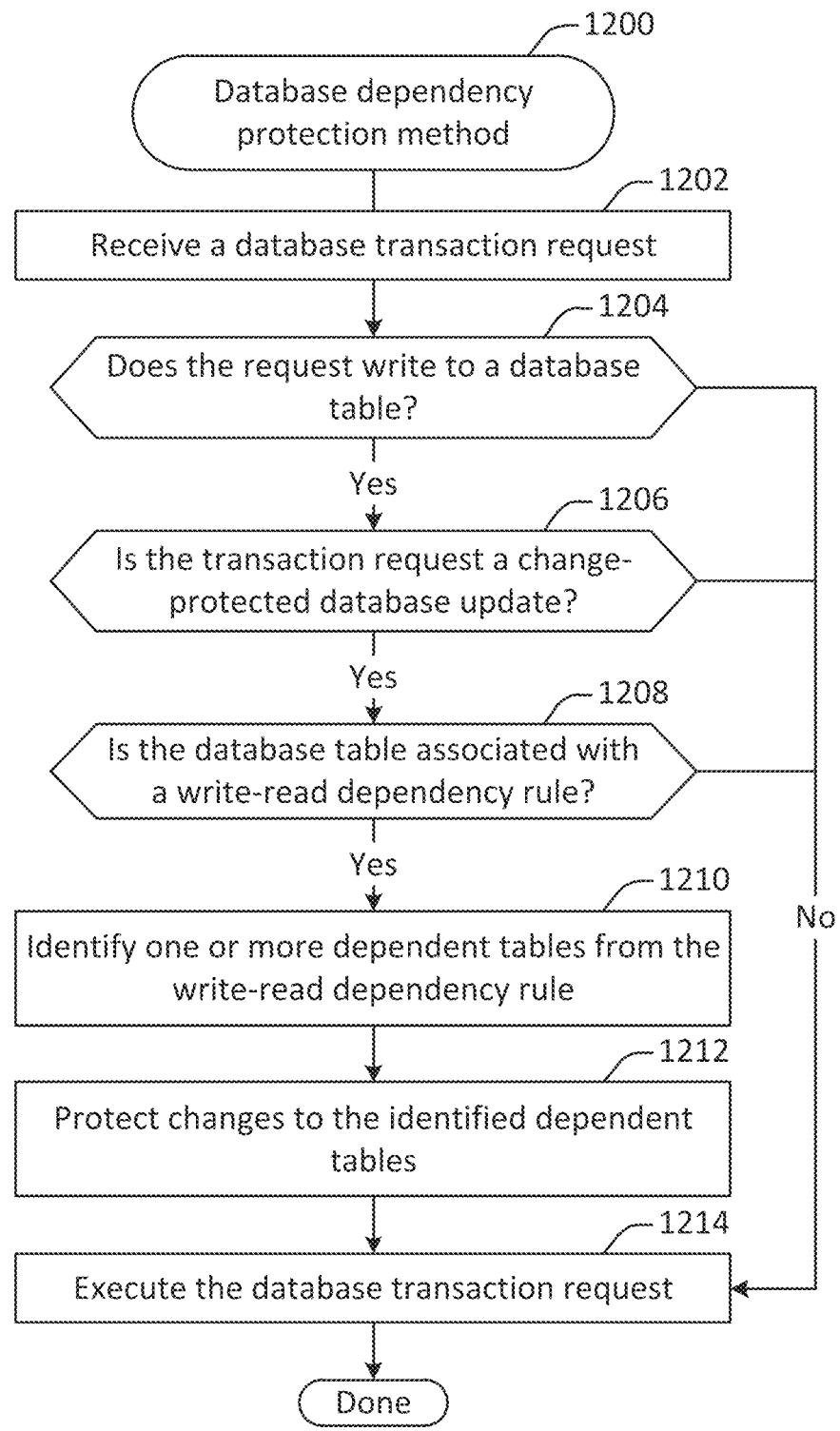
FIG. 12 illustrates a database update dependency protection method, performed in accordance with one or more embodiments.

In some implementations, the database interaction scope 1002 may be created for the purposes of identifying implicit relationships between tables, as discussed with respect to the methods 1100 and 1200 shown in FIGS. 11 and 12. For example, in FIG. 10, the entity 1 1004 may correspond to a contact, while the entity 2 1008 may correspond to a customer. Because a customer may include some number of contacts, the customer entity may include a field that stores a count of the number of contacts associated with that customer. However, this relationship may be implicit in that it is not reflected in native keys within the database but rather is maintained at the application level.

According to various embodiments, an implicit dependency relationship can create problems when using conventional database management techniques. For example, adding a new customer to the contact to the contacts table may result in the customer table being updated to reflect an updated count. However, if the addition of the customer were undone, for instance via techniques discussed with respect to the method 900 shown in FIG. 9, then the updated count value would be incorrect.

In some embodiments, a database interaction scope may be used to identify implicit dependency relationships. For example, as discussed with respect to the methods 1100 and 1200 shown in FIGS. 11 and 12, read and write requests that are included within the same database interaction scope may allow the database system to automatically identify dependency relationships. These dependency relationships may then cause particular database update requests to be applied in a change-protected fashion.

According to various embodiments, the boundaries of a database interaction scope may be determined in any of various ways. For example, a database interaction scope may be defined as including all database access requests received within a particular interaction such as an API call or database update script. As another example, a database interaction scope may be defined as including all database access requests associated with the same organization identifier and received within a designated period of time.

In particular embodiments, the boundaries of a database interaction scope may be determined dynamically based on one or more heuristics or characteristics. Such heuristics may include, for instance, a number of tables or entities being updated, an amount of data being updated, or the identity of the tables or entities being updated.

In particular embodiments, the boundaries of a database interaction scope may be determined dynamically based at least in part on a learning procedure. For instance, the database system may observe many database access requests over time and learn to identify patterns that indicate dependency relationships. Additional details regarding the identification of dependency relationships are discussed with respect to the method 11 shown in FIG. 11.

FIG. 11 illustrates a database table dependency creation method 1100, performed in accordance with one or more embodiments. According to various embodiments, the method 1100 may be implemented on a database system.

At 1102, a database transaction scope is identified. As discussed with respect to FIG. 10, a database transaction scope may include one or more database access requests (e.g., reads and/or writes) that are logically or temporally related. For instance, the access requests may be received as part of the same database transaction (e.g., one or more related scripts and/or API calls).

A determination is made at 1104 as to whether the scope includes a read request from a first database table. If so, then a determination is made at 1106 as to whether the scope includes a write request to a second database table. If so, then a determination is made at 1108 as to whether the first and second tables are linked by a dependency rule. If not, then at 1110 a write-read dependency rule that links the first and second tables is created.

According to various embodiments, the determinations made at operations 1104 and 1106 may be made by analyzing the database requests included in the scope. The determination made at 1108 may be made by querying the table dependency relationships table 480 in the universal data definition repository 400 shown in FIG. 4.

In some implementations, the write-read dependency rule created at 1110 may specify a logical relationship that identifies a condition under which change protection is to be applied to the second database table. The logical reference depends on the inference that if the second database table is updated after reading from the first database table, the second database table may be implicitly dependent on the first database table. Accordingly, the write-read dependency rule specifies that whenever the first database table is updated, changes to the second database table are protected. In this way, if changes to the first database table are restored, changes to the second database table may also be restored.

The database requests included in the scope are executed at 1112. Techniques for executing change-protected database updates in a manner that reflects dependency relationships are discussed in additional detail with respect to the method 1200 shown in FIG. 12.

According to various embodiments, the operations shown in FIG. 11 may be executed in an order different than that shown. For example, one or more operations may be executed in parallel. As another example, operations 1104 and 1106 may be performed in reverse order.

FIG. 12 illustrates a database update dependency protection method 1200, performed in accordance with one or more embodiments. According to various embodiments, the method 1200 may be performed at a database system.

A database transaction request is received at 1202. For instance, the request may be received as discussed with respect to the operation 202 shown in FIG. 2.

At 1204, a determination is made as to whether the request writes to a database table. According to various embodiments, the determination may be made by analyzing the request to identify operations such as "update" or "insert".

If the request writes to a database table, then at 1206 a determination is made as to whether the transaction request is change-protected. In some implementations, the determination may be made as discussed with respect to the method 200 shown in FIG. 2.

If the transaction request is change-protected, then at 1208 a determination is made as to whether the database table is associated with a write-read dependency rule. In some implementations, the determination at 1208 may be made based on querying the table dependency relationships table 480 shown in FIG. 4.

If the transaction request is change-protected, then at 1210 one or more dependent tables are identified from the write-read dependency rule. According to various embodiments, the one or more dependent tables may be identified by analyzing the one or more write-read dependency rules retrieved at operation 1208.

At 1212, changes to the identified tables are protected. In some implementations, protecting changes to the identified tables may involve applying change-protection to all subsequent changes to the identified tables until one or more criteria are met. Such criteria may include, but are not limited to: the passage of a designated period of time, user input provided by an administrator, and the detection of a designated number of updates.

The database transaction request is executed at 1214. According to various embodiments, the database transaction request may be executed as discussed with respect to the methods 500 and 800 shown in FIGS. 5 and 8.

Figure 13:
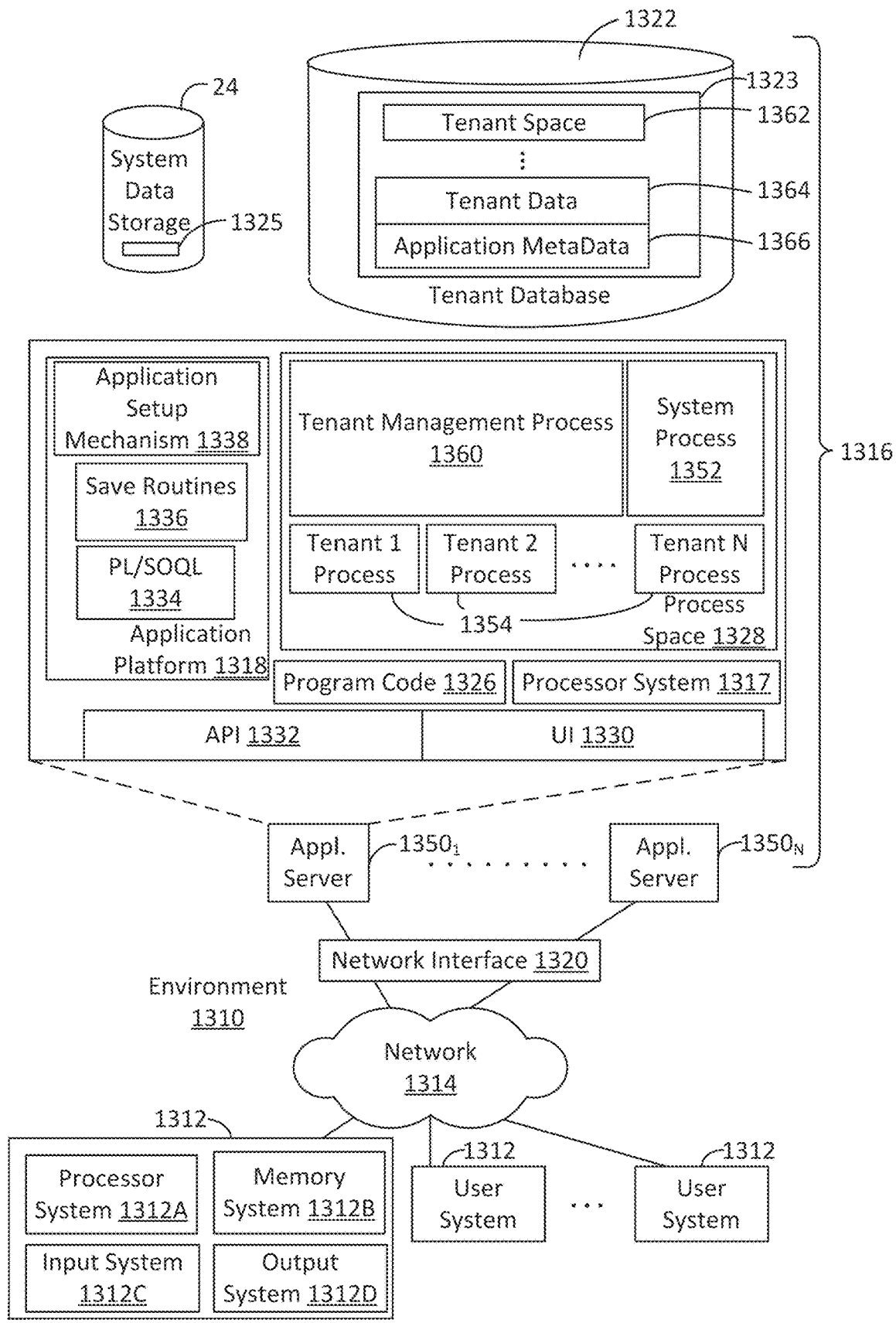
FIG. 13 shows a block diagram of an example of an environment that includes an on-demand database service configured in accordance with some implementations.

FIG. 13 shows a block diagram of an example of an environment 1310 that includes an on-demand database service configured in accordance with some implementations. Environment 1310 may include user systems 1312, network 1314, database system 1316, processor system 1317, application platform 1318, network interface 1320, tenant data storage 1322, tenant data 1323, system data storage 1324, system data 1325, program code 1326, process space 1328, User Interface (UI) 1330, Application Program Interface (API) 1332, PL/SOQL 1334, save routines 1336, application setup mechanism 1338, application servers 1350-1 through 1350-N, system process space 1352, tenant process spaces 1354, tenant management process space 1360, tenant storage space 1362, user storage 1364, and application metadata 1366. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1316, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 1316. Such applications may be developed by the database service provider or by users or third-party application developers accessing the service. Application platform 1318 includes an application setup mechanism 1338 that supports application developers' creation and management of applications, which may be saved as metadata into tenant data storage 1322 by save routines 1336 for execution by subscribers as one or more tenant process spaces 1354 managed by tenant management process 1360 for example. Invocations to such applications may be coded using PL/SOQL 1334 that provides a programming language style interface extension to API 1332. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1366 for a subscriber making such an invocation. Such system processes may also manage execution of application metadata 1366 as an application in a virtual machine.

In some implementations, each application server 1350 may handle requests for any user associated with any organization. A load balancing function (e.g., an F5 Big-IP load balancer) may distribute requests to the application servers 1350 based on an algorithm such as least-connections, round robin, observed response time, etc. Each application server 1350 may be configured to communicate with tenant data storage 1322 and the tenant data 1323 therein, and system data storage 1324 and the system data 1325 therein to serve requests of user systems 1312. The tenant data 1323 may be divided into individual tenant storage spaces 1362, which can be either a physical arrangement and/or a logical arrangement of data. Within each tenant storage space 1362, user storage 1364 and application metadata 1366 may be similarly allocated for each user. For example, a copy of a user's most recently used (MRU) items might be stored to user storage 1364. Similarly, a copy of MRU items for an entire tenant organization may be stored to tenant storage space 1362. A UI 1330 provides a user interface and an API 1332 provides an application programming interface to system 1316 resident processes to users and/or developers at user systems 1312.

System 1316 may implement a web-based database system. For example, in some implementations, system 1316 may include application servers configured to implement and execute database-reliant software applications. The application servers may be configured to provide related data, code, forms, web pages and other information to and from user systems 1312. Additionally, the application servers may be configured to store information to, and retrieve information from a database system. Such information may include related data, objects, and/or Webpage content. With a multi-tenant system, data for multiple tenants may be stored in the same physical database object in tenant data storage 1322, however, tenant data may be arranged in the storage medium(s) of tenant data storage 1322 so that data of one tenant is kept logically separate from that of other tenants. In such a scheme, one tenant may not access another tenant's data, unless such data is expressly shared.

Several elements in the system shown in FIG. 13 include conventional, well-known elements that are explained only briefly here. For example, user system 1312 may include processor system 1312A, memory system 1312B, input system 13120, and output system 13 12D. A user system 1312 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1312 to access, process and view information, pages and applications available from system 1316 over network 1314. Network 1314 may be any network or combination of networks of devices that communicate with one another, such as any one or any combination of a LAN (local area network), WAN (wide area network), wireless network, or other appropriate configuration.

The users of user systems 1312 may differ in their respective capacities, and the capacity of a particular user system 1312 to access information may be determined at least in part by "permissions" of the particular user system 1312. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 1316. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1316 may provide on-demand database service to user systems 1312 using an MTS arrangement. By way of example, one tenant organization may be a company that employs a sales force where each salesperson uses system 1316 to manage their sales process. Thus, a user in such an organization may maintain contact data, leads data, customer follow-up data, performance data, goals and progress data, etc., all applicable to that user's personal sales process (e.g., in tenant data storage 1322). In this arrangement, a user may manage his or her sales efforts and cycles from a variety of devices, since relevant data and applications to interact with (e.g., access, view, modify, report, transmit, calculate, etc.) such data may be maintained and accessed by any user system 1312 having network access.

When implemented in an MTS arrangement, system 1316 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1316 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1316 may also maintain system-level data usable by multiple tenants or other data. Such system-level data may include industry reports, news, postings, and the like that are sharable between tenant organizations.

In some implementations, user systems 1312 may be client systems communicating with application servers 1350 to request and update system-level and tenant-level data from system 1316. By way of example, user systems 1312 may send one or more queries requesting data of a database maintained in tenant data storage 1322 and/or system data storage 1324. An application server 1350 of system 1316 may automatically generate one or more SQL statements (e.g., one or more SQL queries) that are designed to access the requested data. System data storage 1324 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 14A:
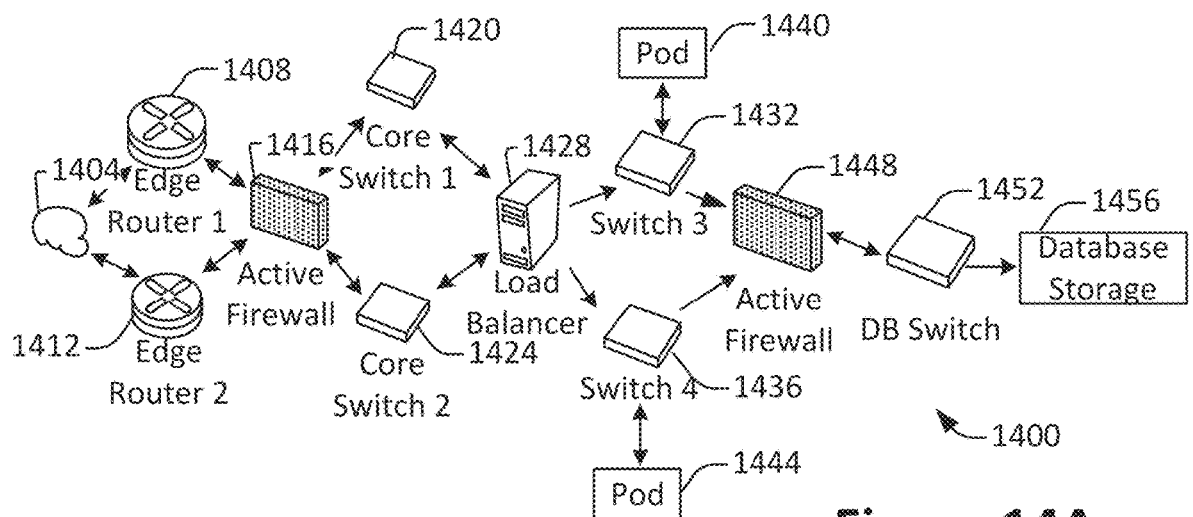
FIG. 14A shows a system diagram of an example of architectural components of an on-demand database service environment, configured in accordance with some implementations.

FIG. 14A shows a system diagram of an example of architectural components of an on-demand database service environment 1400, configured in accordance with some implementations. A client machine located in the cloud 1404 may communicate with the on-demand database service environment via one or more edge routers 1408 and 1412. A client machine may include any of the examples of user systems 1312 described above. The edge routers 1408 and 1412 may communicate with one or more core switches 1420 and 1424 via firewall 1416. The core switches may communicate with a load balancer 1428, which may distribute server load over different pods, such as the pods 1440 and 1444 by communication via pod switches 1432 and 1436. The pods 1440 and 1444, which may each include one or more servers and/or other computing resources, may perform data processing and other operations used to provide on-demand services. Components of the environment may communicate with a database storage 1456 via a database firewall 1448 and a database switch 1452.

Accessing an on-demand database service environment may involve communications transmitted among a variety of different components. The environment 1400 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 14A and 14B.

The cloud 1404 refers to any suitable data network or combination of data networks, which may include the Internet. Client machines located in the cloud 1404 may communicate with the on-demand database service environment 1400 to access services provided by the on-demand database service environment 1400. By way of example, client machines may access the on-demand database service environment 1400 to retrieve, store, edit, and/or process CRM information.

In some implementations, the edge routers 1408 and 1412 route packets between the cloud 1404 and other components of the on-demand database service environment 1400. The edge routers 1408 and 1412 may employ the Border Gateway Protocol (BGP). The edge routers 1408 and 1412 may maintain a table of IP networks or 'prefixes', which designate network reachability among autonomous systems on the internet.

In one or more implementations, the firewall 1416 may protect the inner components of the environment 1400 from internet traffic. The firewall 1416 may block, permit, or deny access to the inner components of the on-demand database service environment 1400 based upon a set of rules and/or other criteria. The firewall 1416 may act as one or more of a packet filter, an application gateway, a stateful filter, a proxy server, or any other type of firewall.

In some implementations, the core switches 1420 and 1424 may be high-capacity switches that transfer packets within the environment 1400. The core switches 1420 and 1424 may be configured as network bridges that quickly route data between different components within the on-demand database service environment. The use of two or more core switches 1420 and 1424 may provide redundancy and/or reduced latency.

In some implementations, communication between the pods 1440 and 1444 may be conducted via the pod switches 1432 and 1436. The pod switches 1432 and 1436 may facilitate communication between the pods 1440 and 1444 and client machines, for example via core switches 1420 and 1424. Also or alternatively, the pod switches 1432 and 1436 may facilitate communication between the pods 1440 and 1444 and the database storage 1456. The load balancer 1428 may distribute workload between the pods, which may assist in improving the use of resources, increasing throughput, reducing response times, and/or reducing overhead. The load balancer 1428 may include multilayer switches to analyze and forward traffic.

In some implementations, access to the database storage 1456 may be guarded by a database firewall 1448, which may act as a computer application firewall operating at the database application layer of a protocol stack. The database firewall 1448 may protect the database storage 1456 from application attacks such as structure query language (SQL) injection, database rootkits, and unauthorized information disclosure. The database firewall 1448 may include a host using one or more forms of reverse proxy services to proxy traffic before passing it to a gateway router and/or may inspect the contents of database traffic and block certain content or database requests. The database firewall 1448 may work on the SQL application level atop the TCP/IP stack, managing applications' connection to the database or SQL management interfaces as well as intercepting and enforcing packets traveling to or from a database network or application interface.

In some implementations, the database storage 1456 may be an on-demand database system shared by many different organizations. The on-demand database service may employ a single-tenant approach, a multi-tenant approach, a virtualized approach, or any other type of database approach. Communication with the database storage 1456 may be conducted via the database switch 1452. The database storage 1456 may include various software components for handling database queries. Accordingly, the database switch 1452 may direct database queries transmitted by other components of the environment (e.g., the pods 1440 and 1444) to the correct components within the database storage 1456.

Figure 14B:
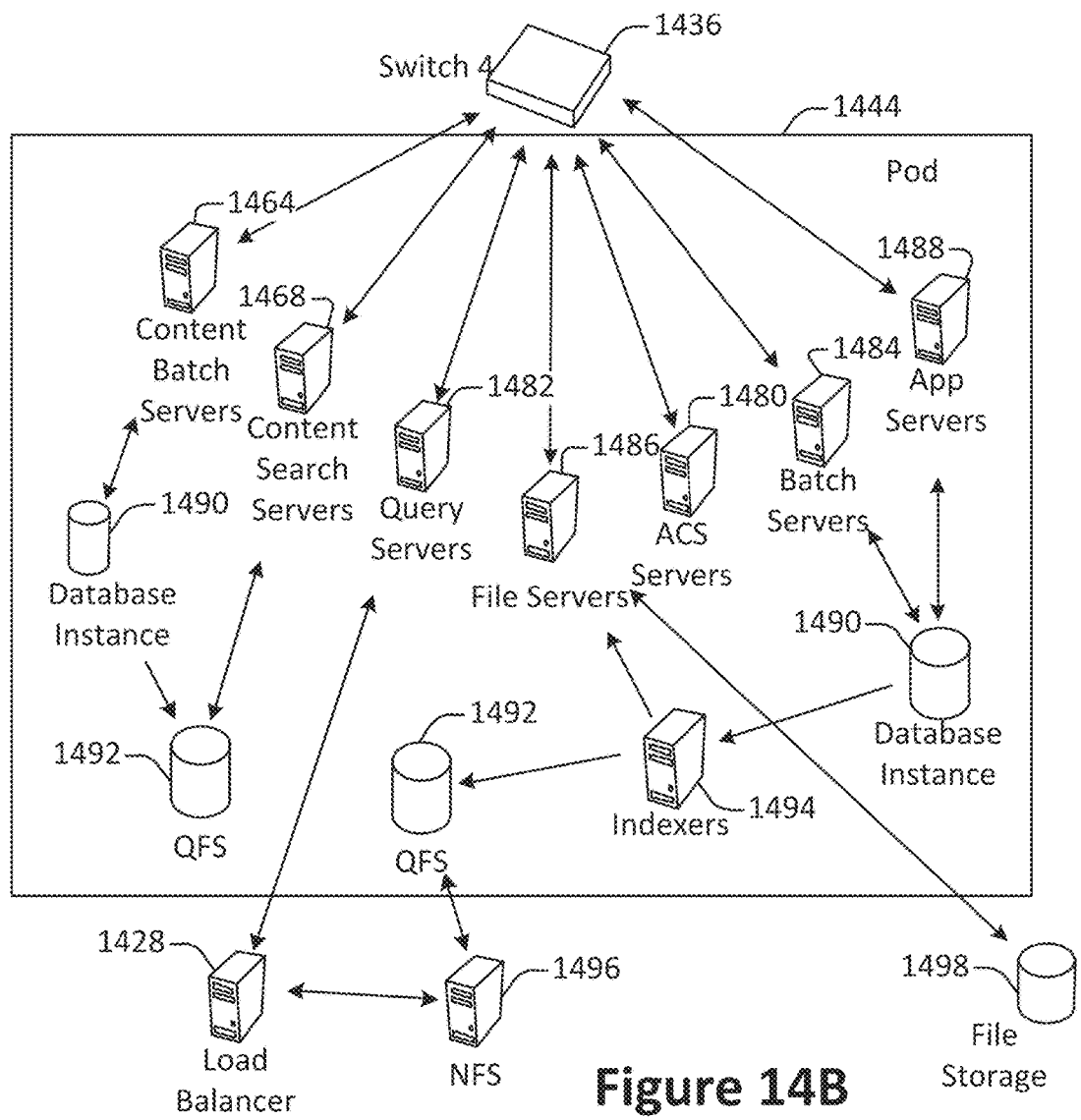
FIG. 14B shows a system diagram further illustrating an example of architectural components of an on-demand database service environment, configured in accordance with some implementations.

FIG. 14B shows a system diagram further illustrating an example of architectural components of an on-demand database service environment, configured in accordance with some implementations. The pod 1444 may be used to render services to user(s) of the on-demand database service environment 1400. The pod 1444 may include one or more content batch servers 1464, content search servers 1468, query servers 1482, file servers 1486, access control system (ACS) servers 1480, batch servers 1484, and app servers 1488. Also, the pod 1444 may include database instances 1490, quick file systems (QFS) 1492, and indexers 1494. Some or all communication between the servers in the pod 1444 may be transmitted via the switch 1436.

In some implementations, the app servers 1488 may include a framework dedicated to the execution of procedures (e.g., programs, routines, scripts) for supporting the construction of applications provided by the on-demand database service environment 1400 via the pod 1444. One or more instances of the app server 1488 may be configured to execute all or a portion of the operations of the services described herein.

In some implementations, as discussed above, the pod 1444 may include one or more database instances 1490. A database instance 1490 may be configured as an MTS in which different organizations share access to the same database, using the techniques described above. Database information may be transmitted to the indexer 1494, which may provide an index of information available in the database 1490 to file servers 1486. The QFS 1492 or other suitable filesystem may serve as a rapid-access file system for storing and accessing information available within the pod 1444. The QFS 1492 may support volume management capabilities, allowing many disks to be grouped together into a file system. The QFS 1492 may communicate with the database instances 1490, content search servers 1468 and/or indexers 1494 to identify, retrieve, move, and/or update data stored in the network file systems (NFS) 1496 and/or other storage systems.

In some implementations, one or more query servers 1482 may communicate with the NFS 1496 to retrieve and/or update information stored outside of the pod 1444. The NFS 1496 may allow servers located in the pod 1444 to access information over a network in a manner similar to how local storage is accessed. Queries from the query servers 1422 may be transmitted to the NFS 1496 via the load balancer 1428, which may distribute resource requests over various resources available in the on-demand database service environment 1400. The NFS 1496 may also communicate with the QFS 1492 to update the information stored on the NFS 1496 and/or to provide information to the QFS 1492 for use by servers located within the pod 1444.

In some implementations, the content batch servers 1464 may handle requests internal to the pod 1444. These requests may be long-running and/or not tied to a particular customer, such as requests related to log mining, cleanup work, and maintenance tasks. The content search servers 1468 may provide query and indexer functions such as functions allowing users to search through content stored in the on-demand database service environment 1400. The file servers 1486 may manage requests for information stored in the file storage 1498, which may store information such as documents, images, basic large objects (BLOBs), etc. The query servers 1482 may be used to retrieve information from one or more file systems. For example, the query system 1482 may receive requests for information from the app servers 1488 and then transmit information queries to the NFS 1496 located outside the pod 1444. The ACS servers 1480 may control access to data, hardware resources, or software resources called upon to render services provided by the pod 1444. The batch servers 1484 may process batch jobs, which are used to run tasks at specified times. Thus, the batch servers 1484 may transmit instructions to other servers, such as the app servers 1488, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 15:
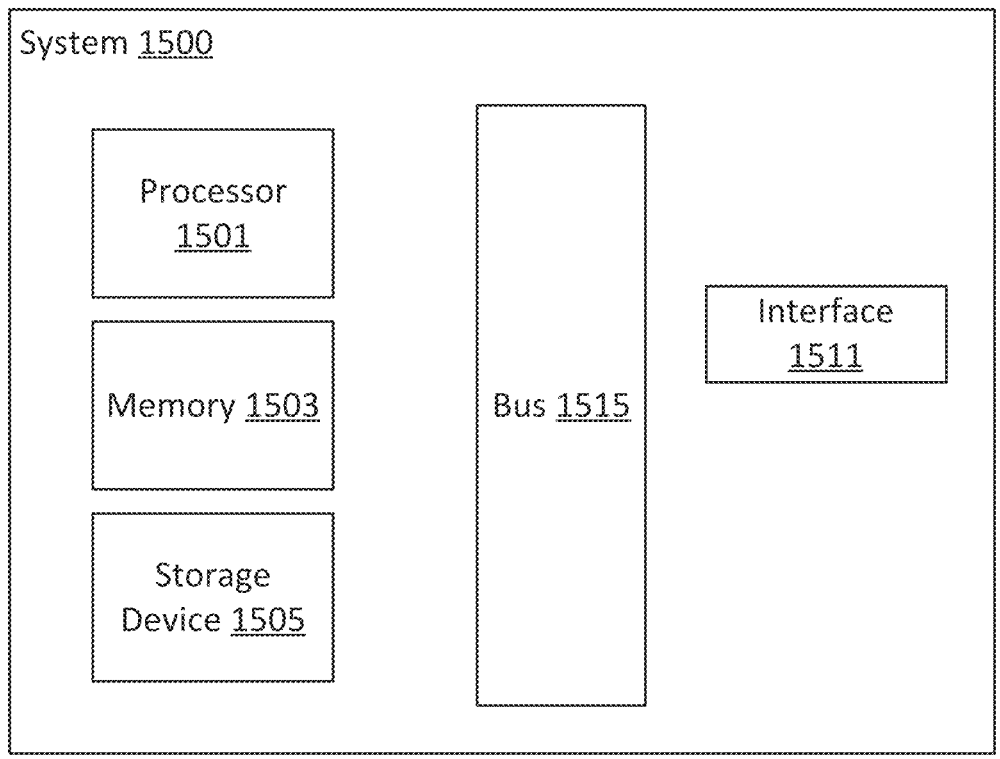
FIG. 15 illustrates one example of a computing device.

FIG. 15 illustrates one example of a computing device. According to various embodiments, a system 1500 suitable for implementing embodiments described herein includes a processor 1501, a memory module 1503, a storage device 1505, an interface 1511, and a bus 1515 (e.g., a PCI bus or other interconnection fabric.) System 1500 may operate as variety of devices such as an application server, a database server, or any other device or service described herein. Although a particular configuration is described, a variety of alternative configurations are possible. The processor 1501 may perform operations such as those described herein. Instructions for performing such operations may be embodied in the memory 1503, on one or more non-transitory computer readable media, or on some other storage device. Various specially configured devices can also be used in place of or in addition to the processor 1501. The interface 1511 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
receiving a first request to execute a database table change operation updating an original data value in a first row in a database table in a database system, the first row including a database table key;
writing an updated data value to a second row in a staging table in the database system, the updated data value corresponding with the original data value, the second row including the database table key;
determining a record value and a replacement value, by applying a value replacement update function stored in the database system, for swapping the original d value and the updated data value, wherein the swapping comprises:
replacing the original data value in the database table with the replacement value; and
replacing the updated data value in the staging table with the record value; and
writing a reversal data value to the first row in the database table upon receiving a request to reverse the database table change operation, the reversal value determined by applying a value replacement restore function to the record value and the replacement value, the value replacement restore function inverting the value replacement update function.

2. The method recited in claim 1, the method further comprising:
receiving a second request to reverse the database table change operation.

3. The method recited in claim 2, the method further comprising:
receiving and executing a third request to update the updated data value, the third request occurring after the receipt of the first request and prior to the receipt of the second request.

4. The method recited in claim 1, wherein the first request is included in a designated database transaction, and wherein the staging table includes only values associated with the designated database transaction.

5. The method recited in claim 1, wherein the staging table is created after receiving the first request.

6. The method recited in claim 1, wherein the staging table is implemented as a temporal database that stores values associated with a succession of changes to the database table.

7. The method recited in claim 1, the method further comprising:
determining whether to execute the first request by evaluating the first request based on one or more heuristics, the evaluation of the first request resulting in a risk level associated with the first request.

8. The method recited in claim 7, wherein the original data value is replaced when the risk level does not exceed a designated threshold.

9. The method recited in claim 1, wherein the database table is stored in a dynamic schema database, and wherein the first row is associated with a first entity definition that defines a data type for the original data value, and wherein the database table includes a third row associated with a second entity definition that differs from the first entity definition.

10. The method recited in claim 1, wherein the database table is stored in a multitenant database, and wherein the first row includes an organization identifier.

11. A database system implemented using a server system, the database system configurable to cause:
receiving a first request to execute a database table change operation updating an original data value in a first row in a database table in a database system, the first row including a database table key;
writing an updated data value to a second row in a staging table in the database system, the updated data value corresponding with the original data value, the second row including the database table key;
determining a record value and a replacement value, by applying a value replacement update function stored in the database system, for swapping the original d value and the updated data value, wherein the swapping comprises:
replacing the original data value in the database table with the replacement value; and
replacing the updated data value in the staging table with the record value; and writing a reversal data value to the first row in the database table upon receiving a request to reverse the database table change operation, the reversal value determined by applying a value replacement restore function to the record value and the replacement value, the value replacement restore function inverting the value replacement update function.

12. The database system recited in claim 11, wherein the database system is further configurable to cause:

receiving a second request to reverse the database table change operation.

13. The database system recited in claim 11, wherein the database system is further configurable to cause:

receiving and executing a third request to update the updated data value, the third request occurring after the receipt of the first request and prior to the receipt of the second request.

14. A computer program product comprising computer-readable program code capable of being executed by one or more processors when retrieved from a non-transitory computer-readable medium, the program code comprising instructions configurable to cause:

receiving a first request to execute a database table change operation updating an original data value in a first row in a database table in a database system, the first row including a database table key;

writing an updated data value to a second row in a staging table in the database system, the updated data value corresponding with the original data value, the second row including the database table key;

determining a record value and a replacement value, by applying a value replacement update function stored in the database system, for swapping the original d value and the updated data value, wherein the swapping comprises:

replacing the original data value in the database table with the replacement value; and replacing the updated data value in the staging table with the record value; and writing a reversal data value to the first row in the database table upon receiving a request to reverse the database table change operation, the reversal value determined by applying a value replacement restore function to the record value and the replacement value, the value replacement restore function inverting the value replacement update function.

\* \* \* \* \*